United States Patent
Han

(10) Patent No.: US 11,856,617 B2
(45) Date of Patent: Dec. 26, 2023

(54) RANDOM ACCESS METHOD AND DEVICE, STORAGE MEDIUM, TERMINAL, AND BASE STATION

(71) Applicant: SPREADTRUM COMMUNICATIONS (SHANGHAI) CO., LTD., Shanghai (CN)

(72) Inventor: Lifeng Han, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 176 days.

(21) Appl. No.: 17/459,291

(22) Filed: Aug. 27, 2021

(65) Prior Publication Data

US 2021/0392702 A1    Dec. 16, 2021

Related U.S. Application Data

(63) Continuation of application No. PCT/CN2020/074694, filed on Feb. 11, 2020.

(30) Foreign Application Priority Data

Feb. 28, 2019   (CN) .......................... 201910150391.8

(51) Int. Cl.
   *H04W 74/08*   (2009.01)
   *H04W 72/044*  (2023.01)
   *H04W 72/1263* (2023.01)
   *H04W 74/00*   (2009.01)

(52) U.S. Cl.
   CPC ... *H04W 74/0841* (2013.01); *H04W 72/0466* (2013.01); *H04W 72/1263* (2013.01); *H04W 74/006* (2013.01)

(58) Field of Classification Search
   CPC ......... H04W 74/0841; H04W 72/0466; H04W 72/1263; H04W 74/006
   See application file for complete search history.

(56) References Cited

U.S. PATENT DOCUMENTS

| | | | |
|---|---|---|---|
| 2017/0009930 A1 | 1/2017 | Lee et al. | |
| 2018/0220345 A1 | 8/2018 | Moon et al. | |
| 2020/0037191 A1* | 1/2020 | Jang | ...................... H04L 1/0026 |

(Continued)

FOREIGN PATENT DOCUMENTS

| CN | 102932917 A | 2/2013 |
|---|---|---|
| CN | 108322936 A | 7/2018 |

(Continued)

OTHER PUBLICATIONS

Intel Corporation, "Consideration of MsgB contents and design"; 3GPP TSG RAN WG2 #106; R2-1906280; Reno, Nevada, US, May 13-17, 2019; 6 pages.

(Continued)

Primary Examiner — Chae S Lee
(74) Attorney, Agent, or Firm — CANTOR COLBURN LLP

(57) ABSTRACT

A method for performing a random access process, and a storage medium are provided. The method includes: sending a first message; and receiving a second message by using a first resource to complete a random access operation, wherein the first resource is used by a single UE, or the first resource is shared by a plurality of UEs having contention.

17 Claims, 8 Drawing Sheets

(56) References Cited

U.S. PATENT DOCUMENTS

2020/0107371 A1* 4/2020 Kunt ............... H04W 76/27
2020/0146069 A1* 5/2020 Chen ............... H04B 17/327
2021/0385867 A1* 12/2021 Futaki ............. H04W 74/0833

FOREIGN PATENT DOCUMENTS

| EP | 3117683 A1 | 1/2017 |
| EP | 3570587 A1 | 11/2019 |
| WO | 2015137632 A1 | 9/2015 |

OTHER PUBLICATIONS

International Search Report for International Application No. PCT/CN/2020/074694; dated Apr. 24, 2020.
LG Electronics Inc. "2-Step CBRA procedure for NR-U"; 3GPP TSG-RAN WG2#103bis; R2-181857; Chengdu, China, Oct. 8-12, 2018; 3 pages.
Mediatek Inc. "Further considerations on 2-step RACH", 3GPP TSG-RAN WG2 Meeting #103bis; R2-1813965; Chengdu, China, Oct. 8-12, 2018; 7 pages.
Mediatek Inc., "2-step RACHmsgB addressing and HARQ" 3GPP TSG-RAN WG2 Meeting #104; R2-1816687; Spokane, US, Nov. 12-16, 2018; 5 pages.
Qualcomm Incorporated, "Procedures for Two-Step RACH", 3GPP TSG-RAN WG1 Meeting #96; R1-1903321; Athens, Greece; Feb. 25- Mar. 1, 2019; 9 pages.
Spreadtrum Communications, "Discussion on 2-step RACH procedure", 3GPP TSG-RAN WG2 Meeting #106; R2-1905686; Reno, USA, May 13-17, 2019; 2 pages.
Zte, "Summary of 7.2.1.2Procedure for Two-step RACH", 3GPP TG RAN WG1 #96; R1-1903436; Athens, Greece, Feb. 25-Mar. 1, 2019; 12 pages.
EPO Extended European Search Report for corresponding EP Application No. 20763627.5; dated Mar. 21, 2022.
Motorola Mobility, et al., " 2-step RACH procedure"; 3GPP TSG RAN WG1 #96, R1-1902843, Feb. 25-Mar. 1, 2019, 3 pages.
Qualcomm Incorporated, "Channel Structure for Two-Step RACH"; 3GPP TSG-RAN WG1 Meeting #96, R1-1902977, Feb. 25-Mar. 1, 2019, 10 pages.
Vivo, "View on 2-step RACH design"; 3GPP TSG RAN WG1 #96, R1-1901671,Feb. 25-Mar. 1, 2019; 5 pages.

* cited by examiner

| R | Timing Advance Command | | Oct 1 |
| Timing Advance Command | | UL Grant | Oct 2 |
| UL Grant | | | Oct 3 |
| UL Grant | | | |
| Temporary C-RNTI | | | |
| Temporary C-RNTI | | | |
| UE Contention Resolution Identity | | | |
| UE Contention Resolution Identity | | | |
| UE Contention Resolution Identity | | | |
| UE Contention Resolution Identity | | | |
| UE Contention Resolution Identity | | | |
| UE Contention Resolution Identity | | | Oct 12 |

RANDOM ACCESS METHOD AND DEVICE, STORAGE MEDIUM, TERMINAL, AND BASE STATION

CROSS-REFERENCE TO RELATED APPLICATIONS

This application is a continuation application under 35 U.S.C. § 120 of International Application No. PCT/CN2020/074694, filed on Feb. 11, 2020, which is incorporated herein by reference and which claimed priority to Chinese Patent Application No. 201910150391.8, filed on Feb. 28, 2019, the entire content of which is also incorporated herein by reference.

TECHNICAL FIELD

The present disclosure generally relates to communication technology field, and more particularly, to a method and a device for performing a random access process, a storage medium, a terminal and a base station.

BACKGROUND

In a 3rd Generation Partnership Project (3GPP) New Radio (NR or 5G) scenario, an air interface of a User Equipment (UE) may have three different states: Radio Resource Control (RRC) idle state (IDLE for short), RRC inactive state (INACTIVE for short) and RRC connected state (CONNNECTED for short).

When in any of the three states, the UE may initiate a random access process. For example, the UE may initiate a random access process when the UE starts an initial access from the RRC idle state, or when the UE initiates a RRC connection re establishment process, or when the UE needs to perform cell handover, or when the UE which is in the RRC connected state has downlink (DL) data or uplink (UL) data arrived in asynchronous state, or when the UE initiates a state migration from the RRC inactive state, or when the UE establishes time synchronization in a process of adding a secondary cell (Scell), or when the UE requests other system information (OSI), or when the UE performs beam failure recovery, etc.

The random access mechanisms mainly include Contention-Based Random Access (CBRA) and Contention-Free Random Access (CFRA). In the CFRA mechanism, a network needs configured dedicated resources in advance (mainly time-frequency resources and code resources for initiating a preamble, which the network may indicate through a parameter random access preamble index (ra-PreambleIndex)). Otherwise, the UE generally uses the CBRA mechanism to perform random access.

Generally speaking, a random access process using the CBRA mechanism mainly includes four steps. In order to accelerate the random access process, reduce time delay and reduce a number of messages, a latest protocol proposes to complete the random access process using the CBRA mechanism in two steps.

However, there are many shortcomings to complete the random access process using the CBRA mechanism in two steps. On the one hand, resource overheads of the UE and the network side are both increased; and on the other hand, the quality of the random access is poor.

SUMMARY

Embodiments of the present disclosure may achieve to perform a two-step random access process under the CBRA mechanism more reasonably.

In an embodiment of the present disclosure, a method for performing a random access is provided, including: sending a first message; and receiving a second message through a first resource to complete the random access process, wherein the first resource is used by a single User Equipment (UE) or shared by a plurality of UEs having contention.

In an embodiment of the present disclosure, a device for performing a random access is provided, including: a sending module, adapted to send a first message; and a first receiving module, adapted to use a first resource to receive a second message to complete the random access process, wherein the first resource is used by a single User Equipment (UE) or shared by a plurality of UEs having contention.

In an embodiment of the present disclosure, a method for performing a random access is provided, including: receiving a first message; and using a first resource to send a second message to complete the random access process, wherein the first resource is used by a single User Equipment (UE) or shared by a plurality of UEs having contention.

In an embodiment of the present disclosure, a device for performing a random access is provided, including: a receiving module, adapted to receive a first message; and a first sending module, adapted to use a first resource to send a second message to complete the random access process, wherein the first resource is used by a single User Equipment (UE) or shared by a plurality of UEs having contention.

In an embodiment of the present disclosure, a non-transitory computer readable storage medium storing one or more programs is provided, the one or more programs including instructions, which, when executed by an electronic device with one or more processors and a plurality of input devices, cause the electronic device to: send a first message; and receive a second message through a first resource to complete the random access process, wherein the first resource is used by a single User Equipment (UE) or shared by a plurality of UEs having contention.

In an embodiment of the present disclosure, a non-transitory computer readable storage medium storing one or more programs is provided, the one or more programs including instructions, which, when executed by an electronic device with one or more processors and a plurality of input devices, cause the electronic device to: receive a first message; and use a first resource to send a second message to complete the random access process, wherein the first resource is used by a single User Equipment (UE) or shared by a plurality of UEs having contention.

In an embodiment of the present disclosure, a terminal including a memory and a processor is provided, wherein the memory has computer instructions stored therein, and when the computer instructions are executed by the processor, the processor is caused to: send a first message; and receive a second message through a first resource to complete the random access process, wherein the first resource is used by a single User Equipment (UE) or shared by a plurality of UEs having contention.

In an embodiment of the present disclosure, a base station including a memory and a processor is provided, wherein the memory has computer instructions stored therein, and when the computer instructions are executed by the processor, the processor is caused to: receive a first message; and use a first resource to send a second message to complete the random access process, wherein the first resource is used by a single User Equipment (UE) or shared by a plurality of UEs having contention.

DETAILED DESCRIPTION

In some embodiments, the two-step random access process under the CBRA mechanism has many problems, which may result in high resource overheads of the UE and the network, increased complexity of the UE and poor random access quality.

Figure 1:
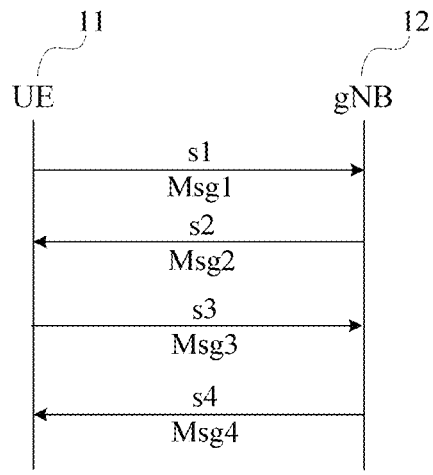
FIG. 1 schematically illustrates a four-step random access process under the CBRA mechanism.
Figure 2:
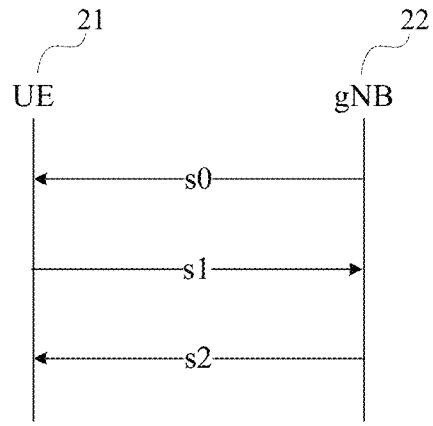
FIG. 2 schematically illustrates a two-step random access process under the CFRA mechanism.

FIG. 1 schematically illustrates a four-step random access process under the CBRA mechanism, and FIG. 2 schematically illustrates a two-step random access process under the CFRA mechanism.

Referring to FIG. 2, a base station (gNB) 22 performs s0 in advance to indicate a dedicated resource for CFRA to a UE 21. Specifically, the dedicated resource may include an allocation information of a random access preamble (a preamble for short), such as time-frequency resources and code resources for the UE21 to initiate the preamble.

When CFRA needs to be initiated, the UE 21 may perform s1 to send the random access preamble through the dedicated resource. In response to receiving the random access preamble, the base station 22 may perform s2 to send a Random Access Response (RAR) message.

At this point, the two-step random access process under the CFRA mechanism is completed.

However, in actual applications, the network will not allocate a dedicated resource for a specific UE for random access. Therefore, the UE and the base station generally use the four-step random access process under the CBRA mechanism shown in FIG. 1 to complete random access.

Referring to FIG. 1, a UE 11 which generates a random access requirement may perform s1 to send a Message 1 (MSG1 for short). Specifically, the UE 11 may select a Synchronizing Signal Block (SSB) or a Channel State Information Reference Signal (CSI-RS) from SSBs and CSI-RSs which meet the conditions. Then a preamble is selected, and a random access preamble sequence is sent at time-frequency resources corresponding to a Physical Random Access Channel Occasion (RO) which is allowed to initiate.

Further, the UE 11 may perform s2 to receive a random access response (ie, MSG2) sent by a base station 12. Specifically, the UE 11 may receive a data in the MSG2 by detecting resources indicated by a Physical Downlink Control Channel (PDCCH) scrambled by a Random Access Radio Network Temporary Identifier (RA-RNTI).

Specifically, the RA-RNTI may be related to a time-frequency position (i.e., RO) of the preamble transmitted when the UE 11 performs s1. For example, the RA-RNTI may be calculated by a following formula:

$$RA\text{-}RNTI = 1 + s\_id + 14 \times t\_id + 14 \times 80 \times f\_id + 14 \times 80 \times 8 \times ul\_carrier\_id.$$

Specifically, the s_id refers to an index number of a first Orthogonal Frequency Division Multiplexing (OFDM) symbol of the PRACH, the t_id refers to an index number of a first time slot of the PRACH in a system frame, the f_id refers to a time domain index number of the PRACH, and the ul_carrier_id refers to an uplink frequency indication used by MSG1, where 0 represents a Normal Uplink (NUL) frequency, and 1 represents a Supplementary Uplink (SUL) frequency.

If multiple UEs use a same RO to send multiple preambles thereof, even if different preambles are selected, a same RA-RNTI is used, so the RAR data in MSG2 sent by the corresponding base station 12 may be multiplexed with multiple UEs.

Figure 3:
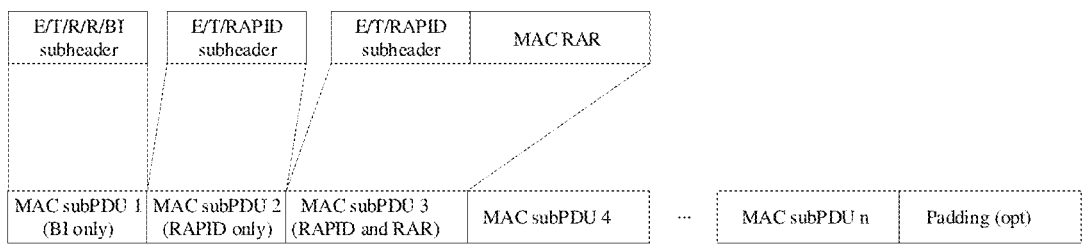
FIG. 3 is a schematic diagram of a Media Access Control Protocol Data Unit (MAC PDU) of a Random Access Response (RAR) in the random access process shown in FIG. 1.

For example, FIG. 3 is a schematic diagram of a Media Access Control Protocol Data Unit (MAC PDU) of a RAR in the random access process shown in FIG. 1. As shown in FIG. 3, a Random Access Preamble Identifier (RAPID) corresponds to the index of the preamble. The UE11 may search for a corresponding RAPID in a subheader of a MAC subPDU according to the preamble selected for sending the MSG1, so as to determine whether to receive a subsequent MAC RAR information or not.

Figure 4:
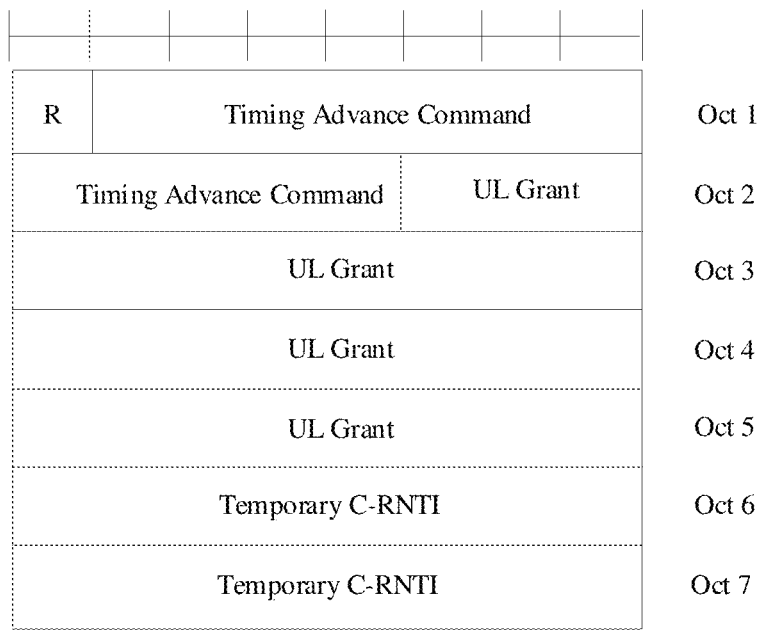
FIG. 4 is a schematic diagram of a RAR in the random access process shown in FIG. 1.

FIG. 4 is a schematic diagram of a MAC RAR in the random access process shown in FIG. 1. Specifically, R refers to a reserved bit, which is not used in the prior art; a Timing Advance Command is used to carry a Timing Advance (TA) information; an uplink grant (UL grant) is used to carry a scheduling information corresponding to a message 3 (MSG3) sent by the UE; and a Temporary Cell Radio Network Temporary Identifier (TC-RNTI) is used for a UE without a Cell Radio Network Temporary Identifier (C-RNTI) to receive a message 4 (MSG4).

As described above, in practical applications, since multiple UEs may select a same RO and a same preamble to initiate random access, contention may happen. Therefore, the following two steps (i.e. S3 and S4) need to be performed to resolve contention.

Further, the UE 11 may perform s3 to send the MSG3 according to an authorization received in the MSG2.

Figure 5:
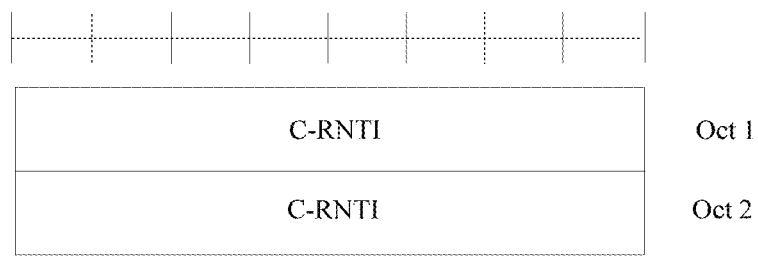
FIG. 5 is a schematic diagram of C-RNTI MAC CE in the random access process shown in FIG. 1.

If the UE 11 has an allocated C-RNTI, the UE 11 may send a C-RNTI MAC Control Element (C-RNTI MAC CE) as shown in FIG. 5. If there is more space, the UE 11 may send other information such as a Buffer Status Report (BSR).

Specifically, a Logical Channel Identify (LCID) may be used to indicate that the MAC sub-PDU includes the corresponding MAC CE.

If the UE 11 does not have an allocated C-RNTI, for example, a UE in the idle state or the inactive state may not be allocated a C-RNTI, the UE11 may send an RRC Common Control Channel (RRC CCCH) message while performing s3. The RRC CCCH message may include: an RRCSetupRequest message, an RRCResumeRequest message, and the like. A part of the information carried in the RRC CCCH may be used as a UE identity for contention resolution.

Further, for the UE 11 with the allocated C-RNTI, in s4, the UE 11 may receive the MSG4 by using the PDCCH scrambled with the allocated C-RNTI. In this case, the scheduled data may be received by a specific UE (i.e. he UE 11). If the MSG4 is received, the UE 11 determines that the contention resolution is successful and the random access process is successful (in other words, the random access process is completed). If the scheduling from the base station 12 is not received within a certain period of time, the UE 11 determines that the contention resolution fails.

For the UE 11 without an allocated C-RNTI, the TC-RNTI obtained in the MSG3 may be used to receive the PDCCH, so as to obtain the MSG4. If the received data carries a MAC CE which includes a UE Contention Resolution Identity, it is determined that the contention resolution is successful. The MAC CE may be indicated by a LCID. And the UE Contention Resolution Identity is the part of the information carried in the RRC CCCH message described above.

In a latest protocol, in order to speed up the random access process, reduce time delay and reduce the number of messages, a two-step random access process under the CBRA mechanism is proposed.

Figures 6, 7:
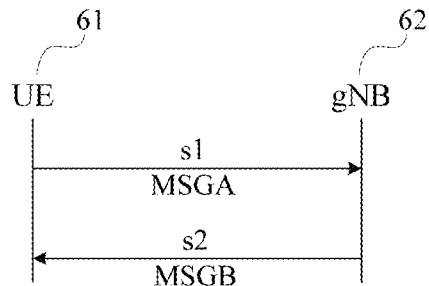
FIG. 6 schematically illustrates a signaling interaction diagram of a two-step random access process under the CBRA mechanism.
FIG. 7 is a schematic diagram of a RAR in the random access process shown in FIG. 6.

For example, referring to FIG. 6, a UE 61 sends a first Message A (MSGA) when performing s1, where the MSGA includes a MSG1 and a MSG3 in the four-step random access process shown in FIG. 1. Further, in response to receiving the MSGA, a base station 62 sends a second Message B (MSGB) when performing s2, where the MSGB includes a MSG2 and a MSG4 in the four-step random access process shown in FIG. 1.

If only a preamble information sent by the UE 61 is received, the base station 62 replies to a MAC RAR in the four-step random access process. In response to receiving the reply information, the UE 61 falls back to the four-step random access process shown in FIG. 1 and continues to send a MSG3.

In order to implement the two-step random access process shown in FIG. 6, two solutions are proposed.

Solution 1: Modify the MAC RAR to carry a UE Contention Resolution Identity. For example, referring to FIG. 7, compared to the RAR information carried by the MSG2 in the four-step random access process shown in FIG. 4, in the two-step random access process shown in FIG. 6, the RAR information carried by MSGB includes at least one UE Contention Resolution Identity.

For the UE 61 with an allocated C-RNTI, TC-RNTI may be used as the UE

Contention Resolution Identity.

In Solution 1, the UE61 still uses RA-RNTI to receive MSGB, and data of multiple UEs are multiplexed in one MAC PDU.

Further, in this case, an UL Grant in the MAC RAR is not needed, which may be used as an information for scheduling a downlink data after the random access process.

Solution 2: The UE 61 without an allocated C-NRNTI may select a C-RNTI from an RNTI resource pool and send the selected C-RNTI to the base station 62 in the MSGA message part for contention resolution. If the base station 62 receives the MSGA from the UE 61, the C-RNTI is used to scramble the PDCCH to schedule the UE 61. After receiving the PDCCH, the UE61 determines that the contention resolution is successful. The UE 61 with the allocated C-RNTI uses the allocated C-RNTI to receive the MSGB, and if the MSGB is received, the UE61 determines that the contention resolution is successful.

In Solution 2, all UEs need to monitor the data scheduled by using the RA-RNTI within a certain time period, in case the base station 62 only receives the preamble and does not receive the data, in which the base station 62 needs to fall back to the four-step random access process.

Inventors of the present disclosure found that in Solution 1, multiple UEs are multiplexed in a MSGB, and the MSGB and the multiple UEs cannot be received independently. In addition, a UE needs to analyze the message part of a MAC RAR to determine a length of the information, which has a great impact on the UE. Further, data received using RA-RNTI does not carry a HARQ ID, which cannot be retransmitted.

Inventors of the present disclosure found that in Solution 2, adding C-RNTI reporting in a MSGA will increase resource overhead of data transmission, and that the base station broadcasts RNTI resource pool will also increase message overhead of a system. In addition, once a UE completes the contention resolution and successfully receives the MSGB, the UE will use the selected C-RNTI, so that the C-RNTI cannot be used by other UEs and the base station needs to update the broadcasting of the RNTI resource pool in real time. In addition, the UE needs to use both the C-RNTI and the RA-RNTI to monitor the PDCCH, which increases the complexity of the UE.

In order to solve the problems described above, for a UE side, a method for performing a random access process is provided in an embodiment of the present disclosure, including: sending a first message; and using a first resource to receive a second message to complete a random access process, wherein the first resource is used by a single UE, or the first resource is shared by multiple UEs in contention. According to the embodiment, a two-step random access process under the CFRA mechanism can be performed more reasonably. Compared with the prior art in which all UEs need to use a same resource to receive scheduling data, the UE in the embodiment may use a specific resource (that is, the first resource) to receive scheduling data, which enables the UE to receive the second message independently, and saves resource overheads of the UE and the network.

In order to clarify the object, characteristic and advantages of embodiments of the present disclosure, embodiments of present disclosure will be described clearly in detail in conjunction with accompanying drawings.

Figure 8:
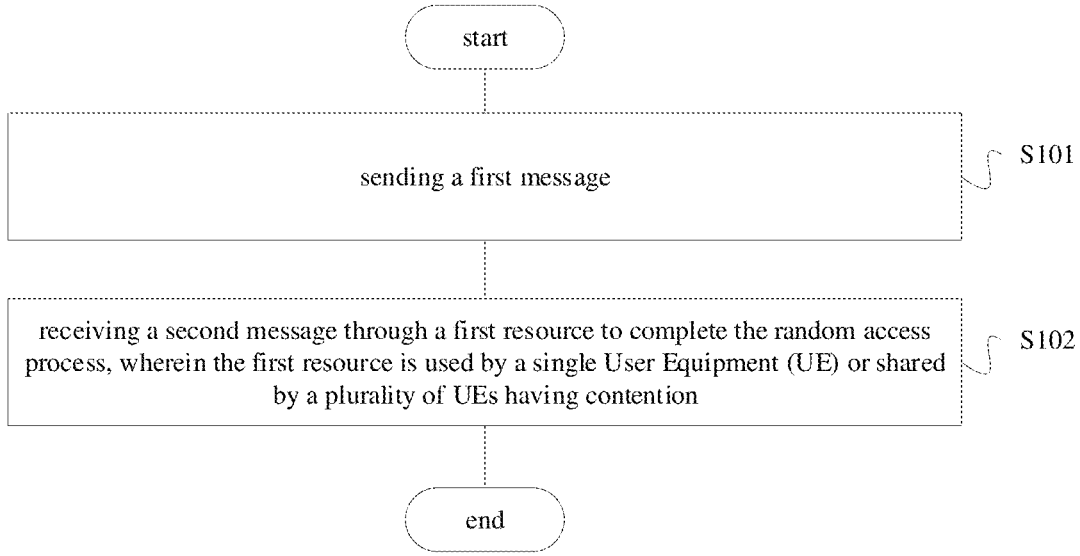
FIG. 8 is a flow chart of a method for performing a random access process according to an embodiment.

FIG. 8 schematically illustrates a flow chart of a method for performing a random access process according to an embodiment. The method may be applied in a two-step random access process under the CBRA mechanism. The method in the embodiment may be executed by a user terminal, such as a UE.

Referring to FIG. 8, the method for performing a random access process includes S101 and S102.

In S101, a first message is sent.

In S102, a first resource is used to receive a second message to complete a random access process, wherein the first resource is used by a single UE or shared by multiple UEs in contention.

Compared with the prior art in which all UEs need to use a same resource to receive scheduling data, the UE in the embodiment may use a specific resource (that is, the first resource) to receive scheduling data, which enables the UE to receive the second message independently, and saves resource overheads of the UE and the network.

In an embodiment, the first message may be a MSGA shown in FIG. 6, and the second message may be a MSGB shown in FIG. 6.

In an embodiment, the first resource may correspond to a preset Temporary UE Radio Network Temporary Identifier (TU-RNTI). Further, the preset TU-RNTI may have a one-to-one correspondence with a second resource used to send the first message. Further, the preset TU-RNTI may include a C-RNTI pre-configured by the network.

In other words, the network may pre-define and broadcast the correspondence between the second resource and the preset TU-RNTI. After selecting the second resource to send the first message, the UE determines the first resource which is subsequently used to receive the second message. Correspondingly, after receiving the first message, the base station, according to the second resource used for transmitting the first message, may determine the TU-RNTI selected by the UE which has sent the first message, and then use the TU-RNTI corresponding to the first resource to send the second message.

Further, the one-to-one correspondence between the preset TU-RNTI and the second resource may be predetermined through a protocol or configured through a system message.

In an embodiment, the one-to-one correspondence between the preset TU-RNTI and the second resource is configured through a system message. Specifically, the system message may configure an initial value and a range of the preset TU-RNTI and specify the one-to-one correspondence between the preset TU-RNTI and the second resource used in the two-step random access process. For example, if the system message indicates that the preset TU-RNTI has an initial value of 34 and a total number of 8, a UE 51 may determine that the range of the preset TU-RNTI is 34 to 41, so as to reduce the overhead of one-by-one configuration.

In another embodiment, a protocol may be used to reserve a part of RNTI exclusively for the preset TU-RNTI, and to specify that the reserved part of RNTI has a one-to-one correspondence with the second resource used in the two-step random access process.

In another embodiment, a calculation formula may be predefined, and the UE 51 may calculate the preset TU-RNTI according to the calculation formula and the second resource. For example, the preset TU-RNTI may be an index value of the preamble used in the two-step random access process, or an index value of a random access occasion list (ra-OccasionList) of a configured RO.

Further, the second resource may include: a resource or an RO resource used to send a random access preamble in the first message, or a resource used to send a data part of the first message.

Figure 9:
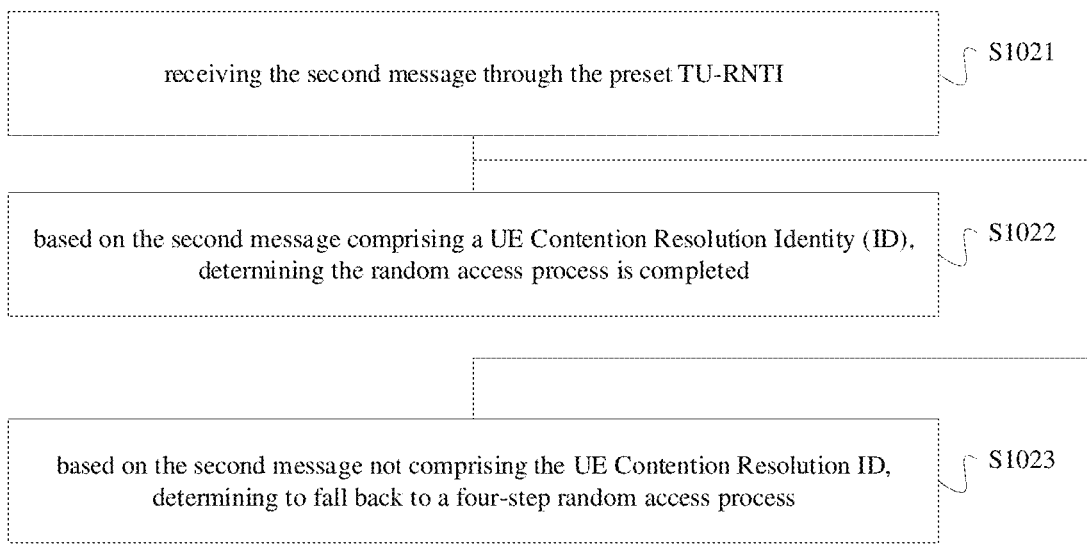
FIG. 9 is a flow chart of S102 shown in FIG. 8 according to an embodiment.

In an embodiment, referring to FIG. 9, S102 may include the following steps:

S1021, the second message is received through the preset TU-RNTI;

In S1022, when the second message includes a UE Contention Resolution ID, it is determined that the random access process is completed; or, In S1023, when the second message does not include the UE Contention Resolution ID, it is determined to fall back to the four-step random access process.

In an embodiment, the UE may monitor the PDCCH scrambled with the preset TU-RNTI to obtain the first resource, and use the first resource to receive the second message.

In an embodiment, in order to prevent the base station from falling back to the four-step random access process because only the preamble in the first message is received, while performing S1021, the UE may also receive the second message through a preset RA-RNTI; and when the second message is received through any RNTI of the preset TU-RNTI and the preset RA-RNTI, the receiving operation on the other RNTI is stopped. Therefore, the problem of monitoring both the two RNTIs in the foregoing Solution 2 may be solved.

Further, if the preset TU-RNTI has a one-to-one correspondence with a resource for sending the random access preamble in the first message, the UE may only monitor the PDCCH scrambled with the preset TU-RNTI, so as to obtain the first resource and use the first resource to receive the second message. If the second message includes the Contention Resolution ID of the UE, the random access process is determined to be successful; if the second message does not include any Contention Resolution ID of any UE, it is determined to fall back to the four-step random access process; if the second message includes a Contention Resolution ID of any other UE, the random access process is determined to have failed; and if the PDCCH scrambled with the preset TU-RNTI is not received within a predefined time window, the random access process is determined to have failed. Therefore, the problem of monitoring both the two RNTIs in the foregoing Solution 2 may be solved. Further, the UE may monitor both the preset TU-RNTI and the preset RA-RNTI within the predefined time window, so as to receive the second message.

In an embodiment, the second message may include a complete Tracking Area (TA) information and/or a re-allocated C-RNTI information, so as to protect the base station from updating System Information Block (SIB) or from pre-configuring a defined RNTI information. In the four-step random access process shown in FIG. 1, the Timing Advance Command in the MSG2 includes 12 bits, but the MAC CE which may be sent to the UE subsequently only carries an adjustment amount based on the complete TA information, where the adjustment amount is about 6 bits. In the embodiment, the MAC RAR information is not transmitted, so it is necessary to obtain a complete Timing Advance Command of a MAC RAR information as shown in FIG. 4, which is about 12 bits.

In an embodiment, a new LCID is added to indicate a complete TA command MAC CE. For example, the complete TA information and/or the re-allocated C-RNTI information may be indicated by one or a combination of the following informations included in the second message: a downlink C-RNTI MAC CE, a complete TA command MAC CE, and a RRC message.

Therefore, according to the embodiments described above, for a UE without an allocated C-RNTI, according to the predetermined corresponding relationship between the preset TU-RNTI and the first resource, the first resource used to receive data may be determined according to the preset TU-RNTI while performing the two-step random access, and an associated RNTI information is not needed to be added to the first message. Therefore, signaling overheads of the UE and the network which are used to indicate a selected C-RNTI to each other can be saved, and resources can be saved.

In another embodiment, before using the first resource to receive the second message, the method for performing a random access process may further include: receiving a third message which includes a first indication information and an uplink authorization information; and when the first indication information is a first indicator, the uplink authorization information is determined to be a downlink authorization information used to indicate the first resource. Specifically, the first indicator is adapted to indicate the uplink authorization information as a downlink authorization information.

In an embodiment, the third message may be a RAR message, and the first indication information may be carried by a reserved bit R of the RAR message shown in FIG. 4.

In another embodiment, the third message may further include at least one TC-RNTI corresponding to the preamble. When the UE has an assigned C-RNTI, in response to receiving the third message, the UE may further compare the TC-RNTI corresponding to the preamble in the third message with the allocated C-RNTI; and when the TC-RNTI corresponding to the preamble in the third message is determined to be same as the allocated C-RNTI, the random access process is determined to be completed.

Further, when the random access process is determined to be completed, S102 may further include: using the first resource to receive the scheduling data of the UE.

When the UE is not allocated with a C-RNTI, S102 may further include: when the second message includes a UE Contention Resolution ID, the random access process is determined to be completed.

In summary, the subsequent steps may be determined according to the first indication information, which facilitates to reduce the amount of data that the UE needs to analyze and reduce time delay. For example, assuming that the first indicator is 1, when the first indication information is 1, the UE with an allocated C-RNTI may use the first resource to receive a subsequent scheduling data, and the UE without an allocated C-RNTI may determine the uplink authorization information as a downlink authorization information, and receive a related UE Contention Resolution ID through a first resource corresponding to the downlink authorization information. When the first indication information is 0 and the RAR carries the preamble sequence identifier used when the UE sends the MSGA, the UE needs to fall back to the four-step random access process shown in FIG. 1, regardless of whether the UE is allocated with a C-RNTI or not.

In an embodiment, receiving the third message may include: listening to the PDCCH scrambled by the preset RA-RNTI to receive the third message.

Figure 10:
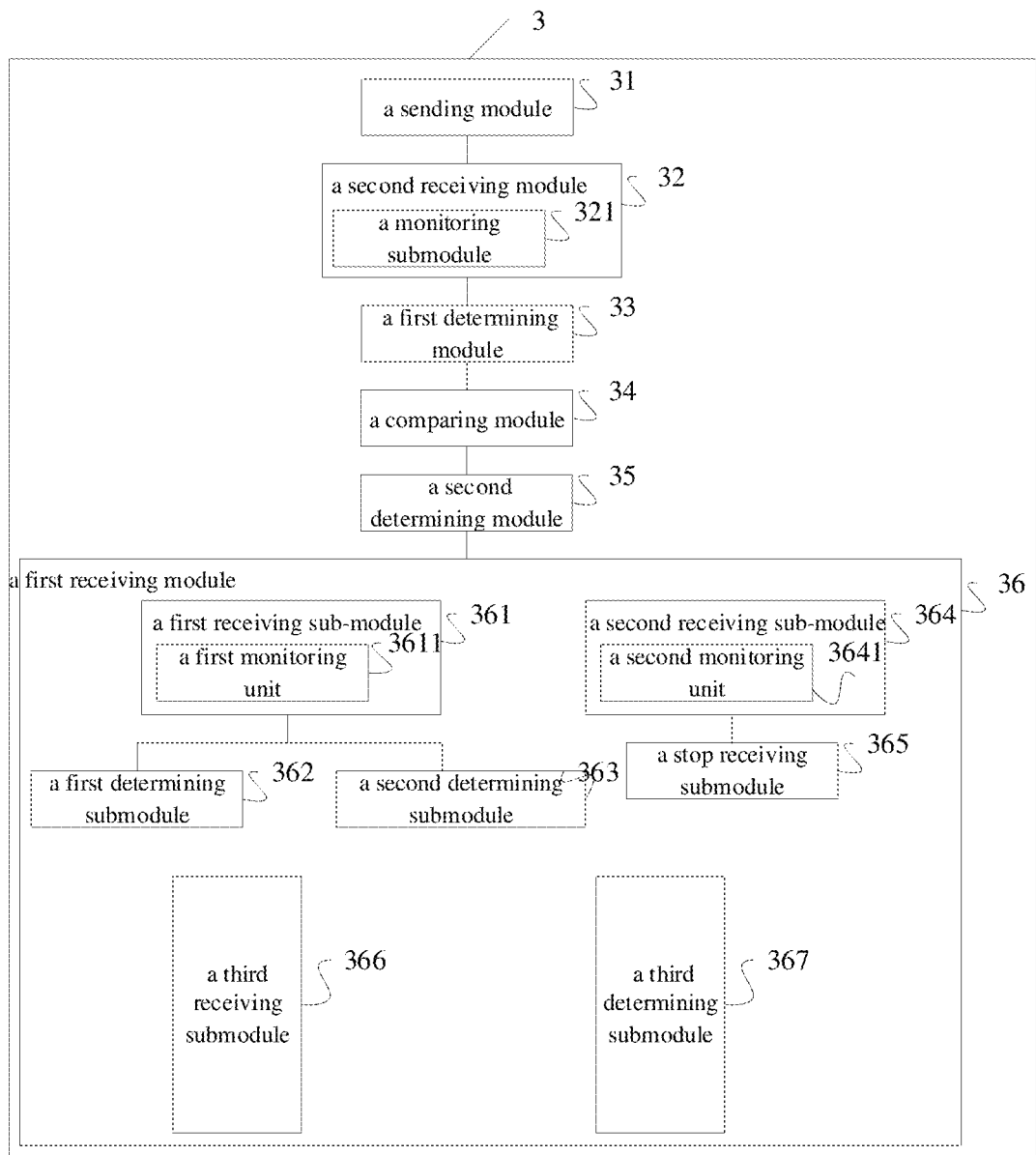
FIG. 10 is a schematic structural diagram of a device for performing a random access process according to an embodiment.

FIG. 10 is a schematic structural diagram of a device for performing a random access process according to an embodiment. Those skilled in the art can understand that the device 3 for performing a random access process described in the embodiment can be used to execute the methods described in the embodiments in conjunction with FIG. 8 and FIG. 9.

In an embodiment, the device 3 for performing a random access process may include: a sending module 31, adapted to send a first message; and a first receiving module 36, adapted to use a first resource to receive a second message to complete a random access process, wherein the first resource is used by a single UE or shared by multiple UEs in contention.

In an embodiment, the first resource is associated with a preset TU-RNTI, and the first receiving module 36 includes: a first receiving sub-module 361, adapted to receive the second message through the preset TU-RNTI; a first determining submodule 362, adapted to, when the second message includes a UE Contention Resolution ID, determine a random access process is completed; and a second determining submodule 363, adapted to, when the second message does not include a UE Contention Resolution ID, determine to fall back to a four-step random access process.

In an embodiment, the first receiving submodule 361 includes: a first monitoring unit 3611, adapted to monitor a PDCCH scrambled using the preset TU-RNTI, obtain the first resource and use the first resource to receive the second message.

In an embodiment, the first receiving module 36 further includes: a second receiving submodule 364, adapted to receive the second message through a preset RA-RNTI while receiving the second message through the preset TU-RNTI; and a stop receiving submodule 365, adapted to, when the second message is received through any RNTI of the preset TU-RNTI and the preset RA-RNTI, stop the receiving operation on the other RNTI.

In an embodiment, the second receiving submodule 364 includes: a second monitoring unit 3641, adapted to monitor the preset TU-RNTI and the preset RA-RNTI within a predefined time window, so as to receive the second message.

In an embodiment, the preset TU-RNTI may have a one-to-one correspondence with the second resource used to send the first message.

In an embodiment, the one-to-one correspondence between the preset TU-RNTI and the second resource may be predetermined through a protocol or configured through a system message.

In an embodiment, the second resource may be selected from: a resource or an RO resource used to send a random access preamble in the first message, or a resource used to send a data part of the first message.

In an embodiment, the second message includes a complete TA information and/or a reallocated C-RNTI information.

In an embodiment, the complete TA information and/or the reallocated C-RNTI information may be indicated by one or a combination of the following informations included in the second message: a downlink C-RNTI MAC CE, a complete TA command MAC CE, and a RRC message.

In another embodiment, the device 3 for performing a random access process may further include: a second receiving module 32, adapted to receive a third message before using the first resource to receive the second message, wherein the third message includes a first indication information and an uplink authorization information; and a first determining module 33, adapted to, when the first indication information is a first indicator, determine the uplink authorization information as a downlink authorization information which is used to indicate the first resource.

In an embodiment, the third message may further include at least one TC-RNTI. When the UE has an allocated C-RNTI, the device 3 for performing a random access process may further include: a comparing module 34, adapted to compare the TC-RNTI included in the third message with the allocated C-RNTI of the UE; and a second determining module 35, adapted to, when a result of comparison shows that the TC-RNTI included in the third message is same as the allocated C-RNTI of the UE, determine the random access process is completed.

In an embodiment, the first receiving module 36 includes: a third receiving submodule 366, adapted to use the first resource to receive a scheduling data of the UE.

In an embodiment, when the UE does not have an allocated C-RNTI, the first receiving module 36 may include: a third determining submodule 367, adapted to, when the second message includes a UE Contention Resolution ID, determine that the random access process is completed.

In an embodiment, the third message is a Random Access Response (RAR), and the first indication information is carried by a reserved bit in the third message.

In an embodiment, the second receiving module 32 includes: a monitoring submodule 321, adapted to listen to a PDCCH scrambled by the preset RA-RNTI, so as to receive the third message.

Principles, detailed implementation and advantages of the device 3 for performing a random access process can be found in the above descriptions of the method as shown in FIG. 8 and FIG. 9, and are not described here.

Figure 11:
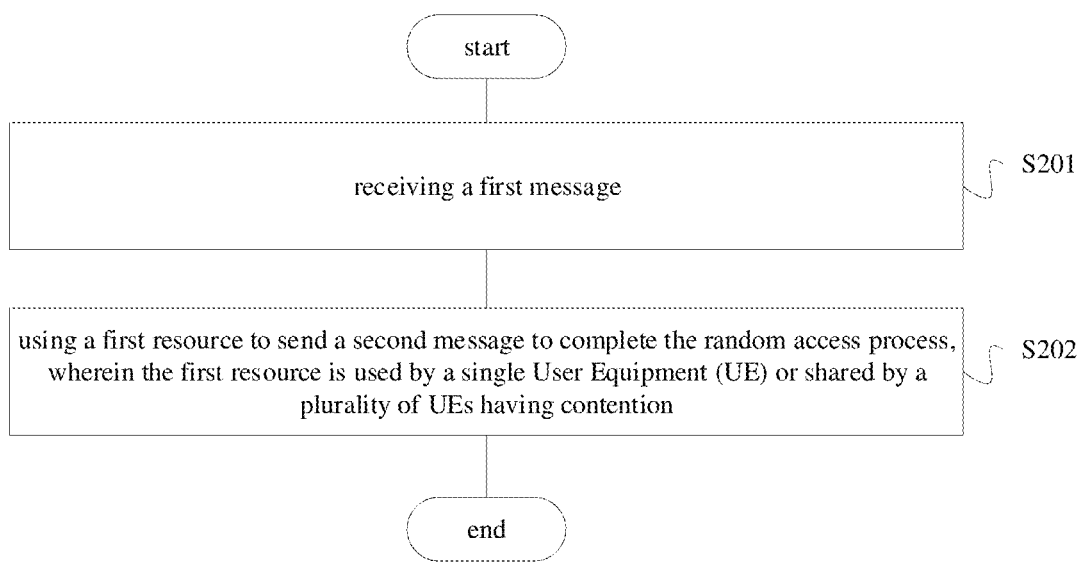
FIG. 11 is a flow chart of a method for performing a random access process according to another embodiment.

FIG. 11 is a flow chart of a method for performing a random access process according to an embodiment. The method in the embodiment may be applied to a two-step random access scenario under the CBRA mechanism. The method in the embodiment may be executed by a network side, for example, executed by a base station on the network side.

In an embodiment, referring to FIG. 11, the method for performing a random access process includes S201 and S202.

In s201, a first message is received.

In S202, a first resource is used to send a second message to complete the random access process, where the first resource is used by a single UE or shared by multiple UEs in contention.

Those skilled in the art can understand that S201 and S202 are corresponding to S101 and S102 described in the embodiments in conjunction with FIG. 8. Principles, detailed implementation and logical steps of the two are complementary. Therefore, for the explanations of the terms involved in the embodiments can be found in the above descriptions of the method as shown in FIG. 8, and are not described here.

In summary, according to the embodiments, a two-step random access process under the CBRA mechanism can be realized more reasonably. Compared with the prior art in which scheduling datas of all UEs are sent through a same resource, the base station in the embodiments may use a specific resource (that is, the first resource) to send the scheduling datas, which enables the base station to send the second message independently to a specific UE, and saves resource overheads of the UE and the network.

In an embodiment, the first resource is associated with a preset TU-RNTI, and the preset TU-RNTI may have a one-to-one correspondence with a second resource used for a UE to send the first message.

In an embodiment, the one-to-one correspondence between the preset TU-RNTI and the second resource may be predetermined through a protocol or configured through a system message.

In an embodiment, the second resource may be selected from: a resource or a RO resource used to send a random access preamble in the first message, or a resource used to send a data part of the first message.

In an embodiment, S202 includes: determining a second message according to the first message; and sending the second message through the preset TU-RNTI. Therefore, signaling overheads which may be used by the UE and the network to indicate a selected C-RNTI to each other are saved, thereby saving resources.

For example, when the first message includes both a random access preamble and a data part, the base station may determine that the second message includes a UE Contention Resolution ID of the UE which have sent the first message. In other words, the random access process of the UE which have sent the first message is successful.

For another example, when the base station only receives the random access preamble, it is determined that the second message does not include the UE Contention Resolution ID of the UE which have sent the first message. In other words, the UE which have sent the first message needs to fall back to the four-step random access process or the random access process of the UE which have sent the first message fails.

Further, the base station may indicate the first resource through the PDCCH scrambled by the preset TU-RNTI, and use the first resource to send the second message. Optionally, the second message includes the UE Contention Resolution ID.

In an embodiment, when the second message does not include the UE Contention Resolution ID, S202 may further include: sending the second message through a preset RA-RNTI.

In an embodiment, S202 may further include: sending the second message within a predefined time window through the preset TU-RNTI or the preset RA-RNTI.

In an embodiment, the second message includes a complete TA information and/or a reallocated C-RNTI information.

In an embodiment, the complete TA information and/or the reallocated C-RNTI information may be indicated by one or a combination of the following informations included in the second message: a downlink C-RNTI MAC CE, a complete TA command MAC CE, and a RRC message.

Therefore, even if the first message sent by the UE does not carry an associated RNTI, the base station may determine the preset TU-RNTI used by the UE according to the second resource associated with the first message.

In another embodiment, before using the first resource to send the second message, the method for performing a random access process may further include: sending a third message, where the third message includes a first indication information and an uplink authorization information, and the first indication information is determined according to the first message. In this way, whether the random access process is completed or not can be indicated based on the first indication information, thereby reducing the amount of data that the UE needs to analyze and reducing time delay.

For example, when the first message includes both a random access preamble and a data part, the first indication information is determined to be a first indicator. And the first indicator is used to indicate that the uplink authorization information is to be used as a downlink authorization information.

For another example, when only the random access preamble is received, it may be determined that the first indication information does not include the first indicator, so as to indicate that the UE needs to fall back to the four-step random access process.

For example, the first indication information may be carried by a reserved bit R in an MAC RAR message. Assuming that the first indicator is 1, that is, the reserved bit R in the MAC RAR message is used and has a value of 1, it indicates that the random access process is successful; otherwise, when the reserved bit R in the MAC RAR message is used and the value is 0, it indicates that the UE needs to fall back to the four-step random access process.

In an embodiment, the third message may further include at least one TC-RNTI corresponding to the preamble (as shown in FIG. 4). When the UE which has sent the first message has an allocated C-RNTI and the first message includes both a random access preamble and a data part, the base station may send the allocated C-RNTI as a TC-RNTI corresponding to a preamble identifier in the third message. Therefore, the random access process of a UE which has received the third message is determined to be completed.

Further, S202 includes: using the first resource to send the scheduling data of the UE.

In another embodiment, when the UE which has sent the first message does not have an allocated C-RNTI, and the first message includes both a random access preamble and a data part, the base station may carry a UE Contention Resolution ID in the second message and send by using the first resource. Therefore, the random access process of a UE which has received the second message is determined to be completed.

In an embodiment, sending the third message may include: sending the third message on a PDCCH scrambled with a preset RA-RNTI.

Figure 12:
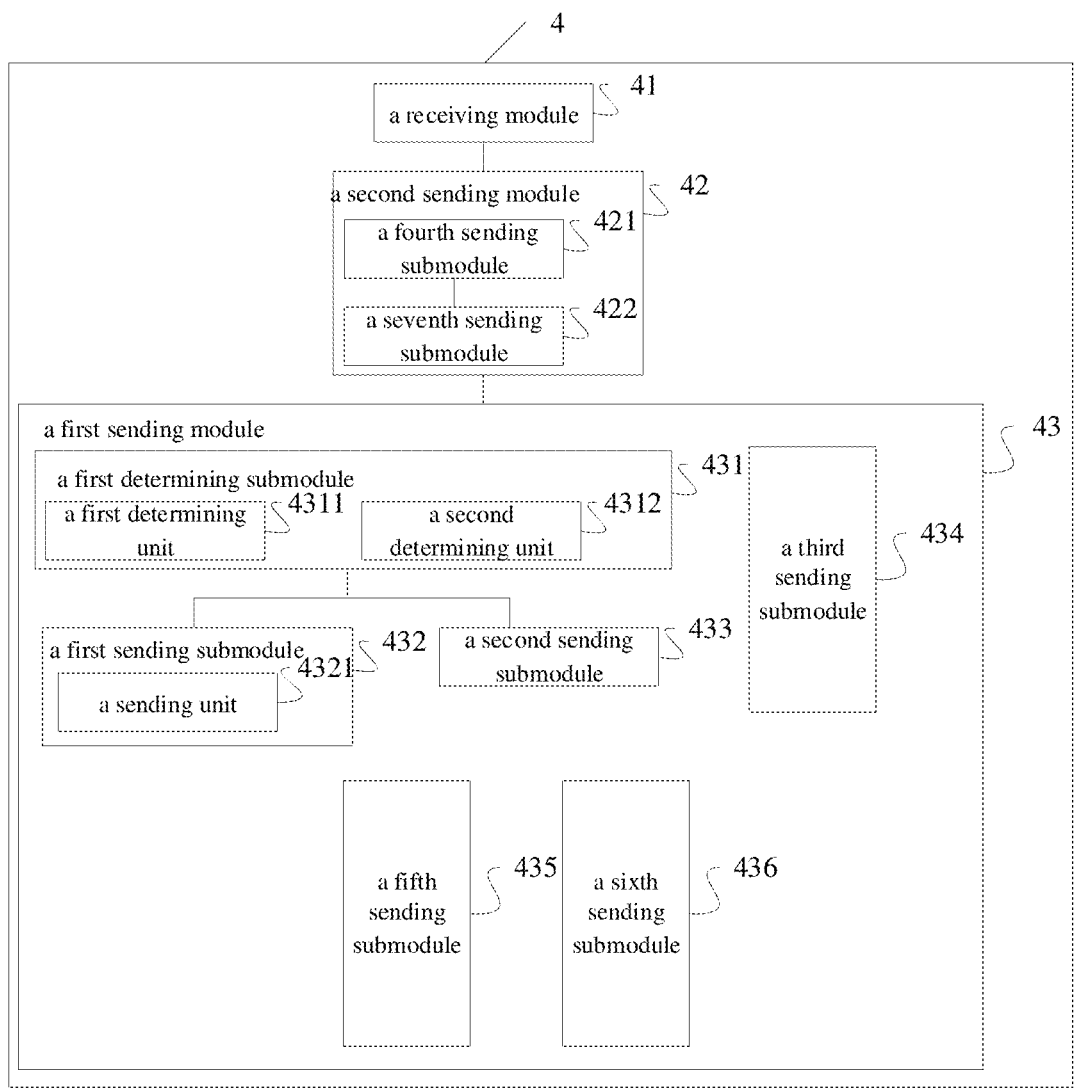
FIG. 12 is a schematic structural diagram of a device for performing a random access process according to another embodiment.

FIG. 12 is a schematic structural diagram of a device for performing a random access process according to an embodiment. Those skilled in the art can understand that a device 4 for performing a random access described in the embodiment can be used to execute the method described in the embodiments in conjunction with FIG. 11.

In an embodiment, the device 4 for performing a random access may include: a receiving module 41, adapted to receive a first message; and a first sending module 43, adapted to use a first resource to send a second message to complete a random access process, wherein the first resource is used by a single UE or shared by multiple UEs in contention.

In an embodiment, the first resource may be associated with a preset TU-RNTI, and the first sending module 43 may include: a first determining submodule 431, adapted to determine the second message according to the first message; and a first sending submodule 432, adapted to send the second message through the preset TU-RNTI.

Further, the first determining submodule 431 may include: a first determining unit 4311, adapted to, when the first message includes both a random access preamble and a data part, determine that the second message includes a UE Contention Resolution ID; and a second determining unit 4312, adapted to, when only the random access preamble is received, determine that the second message does not include the UE Contention Resolution ID.

Further, the first sending submodule 432 may include: a sending unit 4321, adapted to indicate the first resource on a PDCCH scrambled with the preset TU-RNTI and use the first resource to send the second message.

In an embodiment, the first sending module 43 may further include: a second sending submodule 433, adapted to, when the second message does not include the UE Contention Resolution ID, send the second message through a preset RA-RNTI.

In an embodiment, the first sending module 43 may include: a third sending submodule 434, adapted to send the second message through the preset TU-RNTI or the preset RA-RNTI within a predefined time window.

In an embodiment, the preset TU-RNTI may have a one-to-one correspondence with the second resource used to send the first message.

In an embodiment, the one-to-one correspondence between the preset TU-RNTI and the second resource may be predetermined through a protocol or configured through a system message.

In an embodiment, the second resource may be selected from: a resource or an RO resource used to send a random access preamble in the first message, or a resource used to send a data part of the first message.

In an embodiment, the second message includes a complete TA information and/or a reallocated C-RNTI information.

In an embodiment, the complete TA information and/or the reallocated C-RNTI information may be indicated by one or a combination of the following informations included in the second message: a downlink C-RNTI MAC CE, a complete TA command MAC CE, and a RRC message.

In an embodiment, before using the first resource to send the second message, the device 4 for performing a random access process further includes: a second sending module 42, adapted to send a third message, where the third message includes a first indication information and an uplink authorization information, and the first indication information is determined according to the first message.

Further, determining the first indication information according to the first message includes: when the first message includes both a random access preamble and a data part, determining that the first indication information is a first indicator.

In an embodiment, the third message may further include at least one TC-RNTI. When the UE which has sent the first message has an allocated C-RNTI and the first message includes both a random access preamble and a data part, the second sending module 42 may include: a fourth sending submodule 421, adapted to determine the allocated C-RNTI as the at least one TC-RNTI and send the allocated C-RNTI.

Further, the first sending module 43 may include: a fifth sending submodule 435, adapted to use the first resource to send a scheduling data of the UE.

In an embodiment, when the UE which has sent the first message does not have an allocated C-RNTI and the first message includes both a random access preamble and a data part, the first sending module 43 may include: a sixth sending submodule 436, adapted to carry a UE Contention Resolution ID in the second message and send through the first resource.

In an embodiment, the third message may be a RAR, and the first indication information may be carried in a reserved bit of the third message.

In an embodiment, the second sending module 42 may include: a seventh sending submodule 422, adapted to send the third message on a PDCCH scrambled with a preset RA-RNTI.

Principles, detailed implementation and advantages of the device 4 for performing a random access process can be found in the above descriptions of the method as shown in FIG. 11, and are not described here.

In a typical application scenario, for UEs that do not have an allocated C-RNTI, the random access process provided in the embodiments of the present disclosure can execute the two-step random access process under the CBRA mechanism on the basis of the Solution 2 more reasonably.

Figure 13:
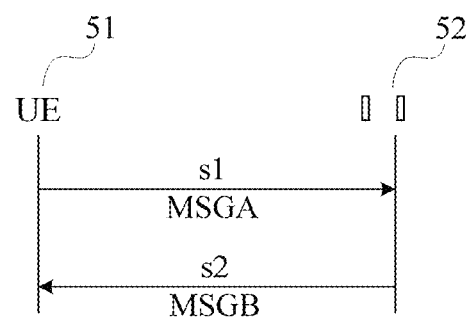
FIG. 13 schematically illustrates a signaling interaction diagram of a typical application scenario according to an embodiment.

In an embodiment, referring to FIG. 13, a UE 51 may perform s1 to send a first message (shown as MSGA in the figure) to a base station 52 through a second resource.

For example, a corresponding preset TU-RNTI may be configured based on a preamble or RO, or may be configured based on resources for sending a data part of the MSGA.

Once the UE 51 selects the second resource for transmitting the preamble, RO or the data part, the preset TU-RNTI is determined. In a subsequent operation of the scenario, both the UE 51 and the base station 52 that received the first message receive and send messages based on the corresponding preset TU-RNTI.

In response to receiving the first message, the base station 52 may determine the preset TU-RNTI used by the UE 51 for the current random access according to the second resource, and perform s2, so as to use first resource associated with the TU-RNTI to send the second message (shown as MSGB in the figure).

In an embodiment, the second message may be determined according to the first message received by the base station 52. For example, when the base station 52 successfully receives the preamble and the data part of the first message, the second message may include a UE Contention Resolution ID of the UE 51; otherwise, the second message does not include the UE Contention Resolution ID of the UE 51.

Further, while performing s2, the second message including the UE Contention Resolution ID may be sent through a PDCCH scrambled with the preset TU-RNTI, and the second message not including the UE Contention Resolution ID may be sent through a PDCCH scrambled with a preset RA-RNTI.

Correspondingly, after sending the first message, the UE 51 may monitor or blindly detect both the PDCCH scrambled with the preset TU-RNTI and the PDCCH scrambled with the preset RA-RNTI. And once the second message is received on either RNTI and that the second message is sent to the UE 51 may be determined, the UE 51 can actively stop receiving the PDCCH scrambled with the other RNTI, thereby saving resources.

Or, when the preset TU-RNTI has a one-to-one correspondence with the resource for sending the random access preamble in the first message, while performing s2, the UE 51 may only monitor the PDCCH scrambled with the preset TU-RNTI to obtain the indicated first resource, and use the first resource to receive the second message.

In an embodiment, in the scenario, the correspondence between the preset TU-RNTI and the second resource may be configured through a system message. For example, the system message may configure an initial value and a range of the preset TU-RNTI and specify a one-to-one correspondence between the preset TU-RNTI and the second resource used in the two-step random access process. For example, if the system message indicates that the preset TU-RNTI has an initial value of 34 and a total number of 8, the UE 51 may determine that the range of the preset TU-RNTI is from 34 to 41, so as to reduce the overhead of one-by-one configuration.

In another embodiment, a protocol may be used to reserve a part of RNTI exclusively for the preset TU-RNTI, and to specify that the reserved part of RNTI has a one-to-one correspondence with the second resource used in the two-step random access process.

In another embodiment, a calculation formula may be predefined, and the UE 51 may calculate the preset TU-RNTI according to the calculation formula and the second resource. For example, the preset TU-RNTI may be an index value of the preamble used in the two-step random access process, or an index value of a random access occasion list (ra-OccasionList) of a configured RO.

Further, the base station 52 may send a complete TA information and a re-allocated C-RNTI information in the second message to avoid updating a SIB or a pre-configured RNTI information.

In another typical application scenario, if the UE only monitors the PDCCH scrambled with a RA-RNTI, the method for preforming a random access process provided in the embodiments can execute the two-step random access process under the CBRA mechanism on the basis of the Solution 1 more reasonably.

Figure 14:
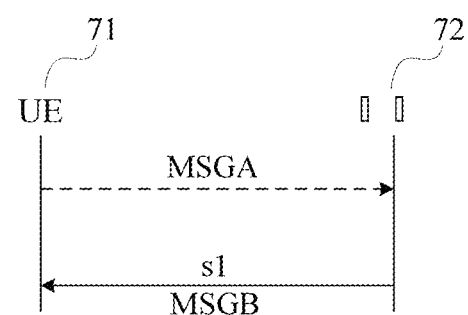
FIG. 14 schematically illustrates a signaling interaction diagram of a typical application scenario according to another embodiment.

Compared with the scenario shown in FIG. 14, the method provided in the embodiments in this scenario focuses on receiving solutions after the UE sends a first message, that is, how a base station carries more instructions to the UE based on an existing message structure of a second message, which facilitates the UE to determine subsequent processing steps more reasonably.

In an embodiment, referring to FIG. 14, after receiving a first message (shown as MSGA in the figure) sent by a UE 71, a base station 72 may determine a second message (shown as MSGB in the figure) according to f the first message, and perform s1 to send the second message. Specifically, no matter what a content of the second message is, the base station 72 uses a PDCCH scrambled with the preset RA-RNTI to send the second message.

Further, when determining the second message, unlike the scenario shown in FIG. 13 described above, the base station 72 uses a reserved bit in a MAC RAR message of the second message to indicate in this scenario. In the prior art, the reserved bit is not used and has a fixed value of 0. Specifically, the reserved bit is located at the forefront of the MAC RAR and may be obtained and decoded by the UE71 earliest. For the convenience of description, a part which carries a first indication information and an uplink authorization information is referred to as a third message in the embodiments described above.

Specifically, the first indication information may be carried in the reserved bit. When the base station 72 receives a preamble and a data part of the first message, the reserved bit is 1; otherwise, the reserved bit is 0.

Further, in response to receiving the MAC RAR message, if the reserved bit in the MAC RAR message is 0, regardless of whether there is an allocated C-RNTI or not, the UE 71 determines to fall back to the traditional four-step random access process. In this case, the UE 71 will not continue to decode the second message, thereby reducing the decoding amount of the UE 71.

Further, in response to receiving the MAC RAR message, if the reserved bit is 1 and the UE 71 does not have an allocated C-RNTI, the UE 71 may take the uplink authorization information indicated in the MAC RAR message as a downlink authorization information and continue to receive a contention resolution information on the first resource. Correspondingly, for the UE 71 without an allocated C-RNTI, the base station 72 carries a UE Contention Resolution ID of the UE 71 in the second message. If the UE71 continues to decode the second message and obtains the UE Conflict Resolution ID, the two-step random access process is considered to be successful; otherwise, it is considered to have failed.

In another embodiment, for a UE 71 with an allocated C-RNTI, when the reserved bit is 1, the UE 71 may further determine whether the TC-RNTI carried in the subsequent second message is the same as its own C-RNTI or not. If yes, the two-step random access process is successful, and the UE 71 may use the uplink authorization information as the downlink authorization information to receive a scheduling data; and if not, the two-step random access process is determined to be a failure. Correspondingly, for the UE 71 with an allocated C-RNTI, the base station 72 may carry a C-RNTI of the UE 71 as the TC-RNTI in the second message, or use the uplink authorization information indicated in the MAC RAR as the downlink authorization information, so as to send the scheduling data of the UE 71.

In summary, according to the embodiments, by broadcasting a preset TU-RNTI corresponding to a resource associated with a RO, a preamble or a data, a UE can use the preset TU-RNTI to monitor a PDCCH to obtain a MSGB. And the UE can monitor the PDCCH by using a RA-RNTI and the preset TU-RNTI.

Further, a LCID can further indicate a downlink C-RNTI MAC CE and reallocate a C-RNTI through the downlink C-RNTI MAC CE; or the LCID can further indicate a complete TA command MAC CE and configure a TA information through the complete TA command MAC CE; or the re-allocated C-RNTI and/or the TA information can be added to a RRC message.

Further, the uplink authorization information in a MAC RAR can be used as a downlink authorization information for a UE using the two-step RACH, and the UE can use the downlink authorization information to receive a specific message which includes a UE Contention Resolution information.

In an embodiment of the present disclosure, a storage medium having computer instructions stored therein is provided, wherein once the computer instructions are executed, the above method as shown in FIGS. 8, FIG. 9 or FIG. 11 is performed. The storage medium may include a Read Only Memory (ROM), a Random Access Memory (RAM), a magnetic disk, an optical disk or the like. Alternatively, the storage medium may include a non-volatile or non-transitory memory or the like.

In an embodiment of the present disclosure, a terminal including a memory and a processor is provided, wherein the memory has computer instructions stored therein, and when the processor executes the computer instructions, the above method as shown in FIG. 8 and FIG. 9 is performed. Optionally, the terminal is a User Equipment (UE).

In an embodiment of the present disclosure, a base station including a memory and a processor is provided, wherein the memory has computer instructions stored therein, and when the processor executes the computer instructions, the above method as shown in FIG. 11 is performed. Optionally, the base station is a gNB.

In an embodiment of the present disclosure, a method for performing a random access is provided, including: sending a first message; and receiving a second message through a first resource to complete the random access process, wherein the first resource is used by a single User Equipment (UE) or shared by a plurality of UEs having contention.

Optionally, the first resource is associated with a preset Temporary UE Radio Network Temporary Identifier (TU-RNTI), and the receiving a second message through a first resource to complete the random access process includes: receiving the second message through the preset TU-RNTI; based on the second message including a UE Contention Resolution Identity (ID), determining the random access process is completed; or based on the second message not including the UE Contention Resolution ID, determining to fall back to a four-step random access process.

Optionally, the receiving the second message through the preset UT-RNTI includes: monitoring a Physical Downlink Control Channel (PDCCH) scrambled with the preset TU-RNTI to obtain the first resource, and use the first resource to receive the second message.

Optionally, the receiving a second message through a first resource to complete the random access process includes: while receiving the second message through the preset TU-RNTI, receiving the second message through a preset Random Access Radio Network Temporary Identifier (RA-RNTI); and based on the second message being received through any RNTI of the preset TU-RNTI and the preset RA-RNTI, stop receiving the second message on the other RNTI.

Optionally, while receiving the second message through the preset TU-RNTI, receiving the second message through a preset RA-RNTI includes: monitoring the preset TU-RNTI and the preset RA-RNTI within a predefined time window to receive the second message.

Optionally, the preset TU-RNTI has a one-to-one correspondence with the second resource used to send the first message.

Optionally, the one-to-one correspondence between the preset TU-RNTI and the second resource is predetermined through a protocol or configured through a system message.

Optionally, the second resource includes: a resource or a Physical Random Access Channel Occasion (RO) resource used to send a random access preamble in the first message, or a resource used to send a data part in the first message.

Optionally, the second message includes a complete Tracking Area (TA) information and/or a re-allocated Cell Radio Network Temporary Identifier (C-RNTI) information.

Optionally, the complete TA information and/or the re-allocated C-RNTI information is indicated by one or a combination of following informations included in the second message: a downlink C-RNTI Media Access Control (MAC) Control Element (CE), a complete TA command MAC CE, and a Radio Resource Control (RRC) message.

Optionally, before using the first resource to receive the second message, the method further includes: receiving a third message, wherein the third message includes a first indication information and an uplink authorization information; and when the first indication information is a first indicator, the uplink authorization information is determined as a downlink authorization information used to indicate the first resource.

Optionally, the third message further includes at least one Temporary Cell Radio Network Temporary Identifier (TC-RNTI), and based on the UE having an allocated C-RNTI, the method further includes: determining whether the TC-RNTI included in the third message is same as the allocated C-RNTI; and based on the TC-RNTI being determined same as the allocated C-RNTI, determining that the random access process is complete.

Optionally, the using the first resource to receive the second message to complete the random access process includes: using the first resource to receive a scheduling data of the UE.

Optionally, based on the UE not having an allocated C-RNTI, the using the first resource to receive the second message to complete the random access process includes: based on the second message including a UE Contention Resolution Identity (ID), determining that the random access process is complete.

Optionally, the third message is a Random Access Response (RAR) message, and the first indication information is carried in a reserved bit of the third message.

Optionally, the receiving the third message includes: monitoring a PDCCH scrambled by a preset RA-RNTI to receive the third message.

In an embodiment of the present disclosure, a device for performing a random access is provided, including: a sending module, adapted to send a first message; and a first receiving module, adapted to use a first resource to receive a second message to complete the random access process, wherein the first resource is used by a single User Equipment (UE) or shared by a plurality of UEs having contention.

In an embodiment of the present disclosure, a method for performing a random access is provided, including: receiving a first message; and using a first resource to send a second message to complete the random access process, wherein the first resource is used by a single User Equipment (UE) or shared by a plurality of UEs having contention.

Optionally, the first resource is associated with a preset Temporary UE Radio Network Temporary Identifier (TU-RNTI), and the using a first resource to send a second message to complete the random access process includes: determining the second message according to the first message; and sending the second message through the preset TU-RNTI.

Optionally, the determining the second message according to the first message includes: based on the first message including both a random access preamble and a data part, determining that the second message includes a UE Contention Resolution Identity (ID); or, based on only the random access preamble being received, determining that the second message does not include the UE Contention Resolution ID.

Optionally, the sending the second message through the preset TU-RNTI includes: indicating the first resource on a Physical Downlink Control Channel (PDCCH) scrambled with the preset TU-RNTI, and using the first resource to send the second message.

Optionally, the using the first resource to send the second message to complete the random access process further includes: based on the second message not including the UE Contention Resolution ID, sending the second message through a preset Random Access Radio Network Temporary Identifier (RA-RNTI).

Optionally, the using a first resource to send a second message to complete the random access process includes: using the preset TU-RNTI or the preset RA-RNTI to send the second message within a predefined time window.

Optionally, the preset TU-RNTI has a one-to-one correspondence with the second resource used to send the first message.

Optionally, the one-to-one correspondence between the preset TU-RNTI and the second resource is predetermined through a protocol or configured through a system message.

Optionally, the second resource includes: a resource or a Physical Random Access Channel Occasion (RO) resource used to send a random access preamble in the first message, or a resource used to send a data part in the first message.

Optionally, the second message includes a complete Tracking Area (TA) information and/or a re-allocated Cell Radio Network Temporary Identifier (C-RNTI) information.

Optionally, the complete TA information and/or the re-allocated C-RNTI information is indicated by one or a combination of following informations included in the second message: a downlink C-RNTI Media Access Control (MAC) Control Element (CE), a complete TA command MAC CE, and a Radio Resource Control (RRC) message.

Optionally, before using the first resource to send the second message, the method further includes: sending a third message, wherein the third message includes a first indication information and an uplink authorization information, and the first indication information is determined according to the first message.

Optionally, the determining the first indication information according to the first message includes: based on the first message including both a random access preamble and a data part, determining that the first indication information is a first indicator.

Optionally, the third message further includes at least one Temporary Cell Radio Network Temporary Identifier (TC-RNTI), and based on the UE which has sent the first message having an allocated C-RNTI and the first message including both a random access preamble and a data part, the sending the third message includes: determining the allocated C-RNTI as one of the at least one TC-RNTI and sending the allocated C-RNTI.

Optionally, the sending the second message through the first resource to complete the random access process includes: using the first resource to send a scheduling data of the UE.

Optionally, based on the UE which has sent the first message not having an allocated C-RNTI and the first message including both a random access preamble and a data part, the using the first resource to send the second message to complete the random access process includes: carrying a UE Contention Resolution ID in the second message and using the first resource to send the second message.

Optionally, the third message is a Random Access Response (RAR) message, and the first indication information is carried in a reserved bit of the third message.

Optionally, the sending the third message includes: sending the third message through a PDCCH scrambled by a preset RA-RNTI.

In an embodiment of the present disclosure, a device for performing a random access is provided, including: a receiving module, adapted to receive a first message; and a first sending module, adapted to use a first resource to send a second message to complete the random access process, wherein the first resource is used by a single User Equipment (UE) or shared by a plurality of UEs having contention.

In an embodiment of the present disclosure, a non-transitory computer readable storage medium storing one or more programs is provided, the one or more programs including instructions, which, when executed by an electronic device with one or more processors and a plurality of input devices, cause the electronic device to: send a first message; and receive a second message through a first resource to complete the random access process, wherein the first resource is used by a single User Equipment (UE) or shared by a plurality of UEs having contention.

In an embodiment of the present disclosure, a non-transitory computer readable storage medium storing one or more programs is provided, the one or more programs including instructions, which, when executed by an electronic device with one or more processors and a plurality of input devices, cause the electronic device to: receive a first message; and use a first resource to send a second message to complete the random access process, wherein the first resource is used by a single User Equipment (UE) or shared by a plurality of UEs having contention.

In an embodiment of the present disclosure, a terminal including a memory and a processor is provided, wherein the memory has computer instructions stored therein, and when the computer instructions are executed by the processor, the processor is caused to: send a first message; and receive a second message through a first resource to complete the random access process, wherein the first resource is used by a single User Equipment (UE) or shared by a plurality of UEs having contention.

In an embodiment of the present disclosure, a base station including a memory and a processor is provided, wherein the memory has computer instructions stored therein, and when the computer instructions are executed by the processor, the processor is caused to: receive a first message; and use a first resource to send a second message to complete the random access process, wherein the first resource is used by a single User Equipment (UE) or shared by a plurality of UEs having contention.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for performing a random access process, comprising:
   sending a first message; and
   receiving a second message through a first resource to complete the random access process, wherein the first resource is used by a single User Equipment (UE) or shared by a plurality of UEs having contention;
   wherein before using the first resource to receive the second message, the method further comprises:
   receiving a third message, wherein the third message comprises first indication information and uplink authorization information; and based on that the first indication information is a first indicator, the uplink authorization information is determined as downlink authorization information used to indicate the first resource.

2. The method according to claim 1, wherein the first resource is associated with a preset Temporary UE Radio Network Temporary Identifier (TU-RNTI), and said receiving a second message through a first resource to complete the random access process comprises:
   receiving the second message through the preset TU-RNTI;
   based on the second message comprising a UE Contention Resolution Identity (ID), determining the random access process is completed; or
   based on the second message not comprising the UE Contention Resolution ID, determining to fall back to a four-step random access process.

3. The method according to claim 2, wherein said receiving the second message through the preset TU-RNTI comprises:
   monitoring a Physical Downlink Control Channel (PDCCH) scrambled with the preset TU-RNTI to obtain the first resource, and use the first resource to receive the second message.

4. The method according to claim 2, wherein said receiving a second message through a first resource to complete the random access process comprises:
   while receiving the second message through the preset TU-RNTI, receiving the second message through a preset Random Access Radio Network Temporary Identifier (RA-RNTI); and
   based on the second message being received through any RNTI of the preset TU-RNTI and the preset RA-RNTI, stop receiving the second message on the other RNTI.

5. The method according to claim 4, wherein while receiving the second message through the preset TU-RNTI, receiving the second message through a preset RA-RNTI comprises:
   monitoring the preset TU-RNTI and the preset RA-RNTI within a predefined time window to receive the second message.

6. The method according to claim 2, wherein the preset TU-RNTI has a one-to-one correspondence with the second resource used to send the first message.

7. The method according to claim 6, wherein the one-to-one correspondence between the preset TU-RNTI and the second resource is predetermined through a protocol or configured through a system message.

8. The method according to claim 6, wherein the second resource comprises: a resource or a Physical Random Access Channel Occasion (RO) resource used to send a random access preamble in the first message, or a resource used to send a data part in the first message.

9. The method according to claim 1, wherein the second message comprises a complete Tracking Area (TA) information and/or a re-allocated Cell Radio Network Temporary Identifier (C-RNTI) information.

10. The method according to claim 9, wherein the complete TA information and/or the re-allocated C-RNTI information is indicated by one or a combination of following information comprised in the second message: a downlink C-RNTI Media Access Control (MAC) Control Element (CE), a complete TA command MAC CE, and a Radio Resource Control (RRC) message.

11. The method according to claim 1, wherein the third message further comprises at least one Temporary Cell Radio Network Temporary Identifier (TC-RNTI), and based on the UE having an allocated C-RNTI, the method further comprises:
    determining whether the TC-RNTI comprised in the third message is same as the allocated C-RNTI; and
    based on the TC-RNTI being determined same as the allocated C-RNTI, determining that the random access process is complete.

12. The method according to claim 11, wherein said using the first resource to receive the second message to complete the random access process comprises:
    using the first resource to receive scheduling data of the UE.

13. The method according to claim 1, wherein based on the UE not having an allocated C-RNTI, said using the first resource to receive the second message to complete the random access process comprises:
    based on the second message comprising a UE Contention Resolution Identity (ID), determining that the random access process is complete.

14. The method according to claim 1, wherein the third message is a Random Access Response (RAR) message, and the first indication information is carried in a reserved bit of the third message.

15. The method according to claim 1, wherein said receiving the third message comprises:
    monitoring a PDCCH scrambled by a preset RA-RNTI to receive the third message.

16. A non-transitory computer readable storage medium storing one or more programs, the one or more programs comprising instructions, which, when executed by an electronic device with one or more processors and a plurality of input devices, cause the electronic device to: send a first message; and receive a second message through a first resource to complete the random access process, wherein the first resource is used by a single User Equipment (UE) or shared by a plurality of UEs having contention;

wherein the electronic device is further caused to receive a third message, wherein the third message comprises first indication information and uplink authorization information, and based on that the first indication information is a first indicator, the uplink authorization information is determined as downlink authorization information used to indicate the first resource.

17. A terminal comprising a memory and a processor, wherein the memory has computer instructions stored therein, and when the computer instructions are executed by the processor, the processor is caused to: send a first message; and receive a second message through a first resource to complete the random access process, wherein the first resource is used by a single User Equipment (UE) or shared by a plurality of UEs having contention;

wherein the processor is further caused to receive a third message, wherein the third message comprises first indication information and uplink authorization information, and based on that the first indication information is a first indicator, the uplink authorization information is determined as downlink authorization information used to indicate the first resource.

* * * * *